(12) United States Patent
Kim et al.

(10) Patent No.: US 10,788,717 B2
(45) Date of Patent: Sep. 29, 2020

(54) LIQUID CRYSTAL DISPLAY DEVICE AND DISPLAY APPARATUS

(71) Applicant: LG Display Co., Ltd., Seoul (KR)

(72) Inventors: Sung Jin Kim, Daegu (KR); Hyun Jeong Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/246,948

(22) Filed: Jan. 14, 2019

(65) Prior Publication Data

US 2019/0146252 A1    May 16, 2019

Related U.S. Application Data

(62) Division of application No. 15/418,450, filed on Jan. 27, 2017, now Pat. No. 10,216,045, which is a
(Continued)

(30) Foreign Application Priority Data

Dec. 10, 2014    (KR) .................... 10-2014-0177865

(51) Int. Cl.
*G02F 1/1339* (2006.01)
*G02F 1/1337* (2006.01)
*C09J 163/00* (2006.01)

(52) U.S. Cl.
CPC .......... *G02F 1/1339* (2013.01); *C09J 163/00* (2013.01); *G02F 1/1337* (2013.01);
(Continued)

(58) Field of Classification Search
CPC ............. G02F 1/1339; G02F 1/133723; G02F 1/13378; G02F 1/133788;
(Continued)

(56) References Cited

U.S. PATENT DOCUMENTS 5,150,239 A    9/1992 Watanabe et al.
5,554,691 A    9/1996 St. Clair
(Continued)

FOREIGN PATENT DOCUMENTS

CN    1275215 A    11/2000
CN    1340592 A    3/2002
(Continued)

OTHER PUBLICATIONS

Office Action for U.S. Appl. No. 14/875,510, dated Aug. 16, 2016, 10 Pages.
(Continued)

*Primary Examiner* — Ruiyun Zhang
(74) *Attorney, Agent, or Firm* — Fenwick & West LLP

(57) ABSTRACT

Disclosed is a liquid crystal display (LCD) device. The LCD device includes a first substrate and a second substrate facing each other, a liquid crystal layer between the first substrate and the second substrate, an alignment layer on at least one of the first and second substrates for alignment of liquid crystals in the liquid crystal layer, and a sealant in an edge area of each of the first and second substrates to bond the first substrate to the second substrate, the sealant including a diene compound.

15 Claims, 2 Drawing Sheets

Related U.S. Application Data division of application No. 14/875,510, filed on Oct. 5, 2015, now Pat. No. 9,618,799.

(52) U.S. Cl.
CPC .. *G02F 1/133723* (2013.01); *G02F 1/133788* (2013.01); *G02F 2202/021* (2013.01); *G02F 2202/022* (2013.01); *G02F 2202/28* (2013.01); *Y10T 428/10* (2015.01); *Y10T 428/1005* (2015.01); *Y10T 428/1059* (2015.01)

(58) Field of Classification Search
CPC ....... G02F 2001/13398; G02F 2202/28; G02F 2202/021; C09J 163/00; C08G 73/1007; C08G 73/101; C08G 73/1025; Y10T 428/10; Y10T 428/1005; Y10T 428/1018; Y10T 428/1025; Y10T 428/1059; Y10T 428/1073
USPC ......... 428/1.1, 1.2, 1.25, 1.5, 1.53; 349/123, 349/124, 126, 153, 190
See application file for complete search history.

(56) References Cited

U.S. PATENT DOCUMENTS

| | | | |
|---|---|---|---|
| 6,733,958 | B2 | 5/2004 | Fukuda |
| 6,989,879 | B1 | 1/2006 | Nakahara et al. |
| 2003/0147032 | A1 | 8/2003 | Park et al. |
| 2005/0073638 | A1 | 4/2005 | Byun et al. |
| 2007/0178250 | A1* | 8/2007 | Tomioka ............... G02F 1/1337 428/1.26 |
| 2008/0129946 | A1 | 6/2008 | Chan et al. |
| 2014/0350136 | A1 | 11/2014 | Xiao et al. |

FOREIGN PATENT DOCUMENTS

| | | |
|---|---|---|
| CN | 1437050 A | 8/2003 |
| CN | 1605915 A | 4/2005 |
| CN | 102766047 A | 11/2012 |

OTHER PUBLICATIONS

The State Intellectual Property Office of the People's Republic of China, First Office Action, Chinese Patent Application No. 201510727986.7, dated May 21, 2018, 16 pages.

United States Office Action, U.S. Appl. No. 15/418,450, dated Sep. 11, 2018, seven pages.

United States Office Action, U.S. Appl. No. 15/418,450, dated Jun. 4, 2018, eight pages.

* cited by examiner

LIQUID CRYSTAL DISPLAY DEVICE AND DISPLAY APPARATUS

CROSS-REFERENCE TO RELATED APPLICATIONS

This application is a divisional application of U.S. patent application Ser. No. 15/418,450 filed on Jan. 27, 2017, which is a divisional application of U.S. patent application Ser. No. 14/875,510 filed on Oct. 5, 2015, which claims the benefit of Republic of Korea Patent Application No. 10-2014-0177865 filed on Dec. 10, 2014, all of which are hereby incorporated by reference as if fully set forth herein.

BACKGROUND

Field of the Invention

The present invention relates to a liquid crystal display (LCD) device and a display apparatus, and more particularly, to a sealant for bonding a lower substrate to an upper substrate.

Discussion of the Related Art

LCD devices include a lower substrate, an upper substrate, and a liquid crystal layer formed therebetween, wherein an alignment state of the liquid crystal layer is changed by an electric field applied thereto, and thus, a transmittance of light is adjusted, thereby displaying an image.

Hereinafter, a related art LCD device will be described with reference to the drawing.

FIG. 1 is a schematic cross-sectional view of a related art LCD device.

As seen in FIG. 1, the related art LCD device includes an upper substrate 10, a lower substrate 20, a liquid crystal layer 30, and a sealant 40.

Although not shown in detail, a black matrix and a color filter are formed on the upper substrate 10, and a thin film transistor (TFT) and a pixel electrode are formed on the lower substrate 20.

The liquid crystal layer 30 is formed between the upper substrate 10 and the lower substrate 20. Alignment layers 12 and 22 are formed on a surface contacting the liquid crystal layer 30, for an initial alignment of the liquid crystal layer 30. That is, an upper alignment layer 12 is formed on a bottom surface of the upper substrate 10, and a lower alignment layer 22 is formed on a top surface of the lower substrate 20.

The sealant 40 is formed on an edge area between the upper substrate 10 and the lower substrate 20. The sealant 40 bonds the upper substrate 10 to the lower substrate 20 and prevents the liquid crystal layer 30 from being leaked to the outside. Therefore, the sealant 40 includes, as a main component, an adhesive component for bonding the upper substrate 10 to the lower substrate 20.

Recently, an attempt to newly design LCD devices is being continuously made for satisfying various demands of consumers, and to this end, an attempt to decrease bezel widths of the LCD devices is made. If a bezel width of an LCD device is reduced, a display surface where an image is displayed is enlarged. In order to reduce a bezel width, an area where the sealant 40 contacts the alignment layers 12 and 22 is enlarged. This will be described below in detail.

When a bezel width of the LCD device is large, an interval or a distance between an end of the upper substrate 10 and an end of the upper alignment layer 12 may be broadened, and thus, the sealant 40 may be formed not to contact the upper alignment layer 12. Also, an interval or a distance between an end of the lower substrate 20 and an end of the lower alignment layer 22 may be broadened, and thus, the sealant 40 may be formed not to contact the lower alignment layer 22.

On the other hand, when a bezel width of the LCD device is small, the interval or a distance between the end of the upper substrate 10 and the end of the upper alignment layer 12 should be reduced, and for this reason, it is difficult to form the sealant 40 so as not to contact the upper alignment layer 12. Also, since the interval or the distance between the end of the lower substrate 20 and the end of the lower alignment layer 22 should be reduced, it is difficult to form the sealant 40 so as not to contact the lower alignment layer 22. Therefore, as illustrated, the sealant 40 contacts the alignment layers 12 and 22.

However, an adhesive force between the upper substrate 10 and the lower substrate 20 is more reduced in a case, where the sealant 40 is formed to contact the alignment layers 12 and 22 for reducing a bezel width of the LCD device, than a case where the sealant 40 is formed not to contact the alignment layers 12 and 22.

SUMMARY

Accordingly, the present invention is directed to provide a liquid crystal display (LCD) device and a display apparatus that substantially obviate one or more problems due to limitations and disadvantages of the related art.

When a sealant contacts an alignment layer, an adhesive force between an upper substrate and a lower substrate is reduced. Therefore, in order to enhance the adhesive force between the upper substrate and the lower substrate, it can be proposed to form the sealant not to contact the alignment layer or enhance bonding force between the sealant and the alignment layer.

Since the method of forming the sealant not to contact the alignment layer causes an increase in a bezel width of the LCD device, it is difficult to satisfy the recent demands of consumers. Therefore, the present invention provides a method that enhances a bonding force between a sealant and an alignment layer so as to reduce a bezel width of the LCD device and enhance an adhesive force between an upper substrate and a lower substrate.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a liquid crystal display (LCD) device including: a first substrate and a second substrate facing each other; a liquid crystal layer between the first substrate and the second substrate; an alignment layer on at least one of the first and second substrates for alignment of liquid crystals in the liquid crystal layer; and a sealant in an edge area of each of the first and second substrates to bond the first substrate to the second substrate, the sealant including a diene compound.

The diene compound may include a compound represented by Chemical Formula 1:

[Chemical Formula 1]

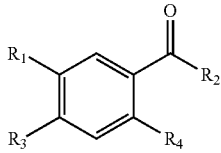

where $R_1$, $R_2$, and $R_3$ are independently one among hydrogen, a halogen atom, a phenyl group, an alkyl group of $C_1$~$C_9$, an alkoxy group of $C_1$~$C_9$, a vinyl group of $C_2$~$C_4$, and an acetyl group of $C_2$~$C_4$, and $R_4$ is one among a phenyl group, an alkyl group of $C_1$~$C_9$, an alkoxy group of $C_1$~$C_9$, a vinyl group of $C_2$~$C_4$, and an acetyl group of $C_2$~$C_4$.

The alignment layer may include a compound represented by Chemical Formula 2:

[Chemical Formula 2]

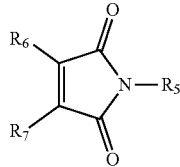

where $R_5$ is one among hydrogen, halogen atom, a phenyl group, an alkyl group of $C_1$~$C_9$, an alkoxy group of $C_1$~$C_9$, a vinyl group of $C_2$~$C_4$, and an acetyl group of $C_2$~$C_4$, and $R_6$ and $R_7$ are independently one among hydrogen and an alkyl group of $C_1$~$C_6$.

The sealant may contact the alignment layer, and a contact surface between the sealant and the alignment layer may include a compound represented by Chemical Formula 3:

[Chemical Formula 3]

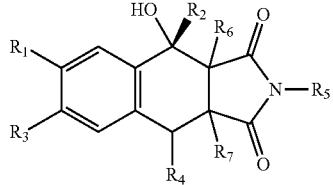

where $R_1$, $R_2$, $R_3$, and $R_5$ are independently one among hydrogen, a halogen atom, a phenyl group, an alkyl group of $C_1$~$C_9$, an alkoxy group of $C_1$~$C_9$, a vinyl group of $C_2$~$C_4$, and an acetyl group of $C_2$~$C_4$, and $R_4$ is one among a phenyl group, an alkyl group of $C_1$~$C_9$, an alkoxy group of $C_1$~$C_9$, a vinyl group of $C_2$~$C_4$, and an acetyl group of $C_2$~$C_4$, and $R_6$ and $R_7$ are independently one among hydrogen and an alkyl group of $C_1$~$C_6$.

The diene compound may be chemically bonded to the alignment layer by ultraviolet (UV) rays.

A chemical bond of a compound for the alignment layer may not be broken within a wavelength range of the UV rays.

An alignment direction of a compound for the alignment layer may be determined by UV rays having a wavelength range which does not overlap a wavelength range of the UV rays involved in the diene compound chemical bonding to the alignment layer.

The sealant may further include an epoxy resin, and the alignment layer may include amic acid.

The sealant may contact the alignment layer, and a contact surface between the sealant and the alignment layer may include a COO bond by a reaction of the epoxy resin with a carboxylic group (COOH) of the amic acid.

In another aspect of the present invention, there is provided a display apparatus including: a first substrate and a second substrate facing each other; an alignment layer on at least one of the first and second substrates; and a sealant configured to bond the first substrate to the second substrate, wherein the sealant includes a compound that reacts with the alignment layer within a wavelength range where a chemical bond included in the alignment layer is maintained, for enhancing adhesive bonding force between the sealant and the alignment layer.

The wavelength range where the chemical bond included in the alignment layer is maintained may be 300 nm to 420 nm.

The alignment layer may include a maleimide functional group.

The sealant may be chemically bonded to the maleimide functional group.

The sealant may include a diene compound.

The sealant may include a compound represented by Chemical Formula 1:

[Chemical Formula 1]

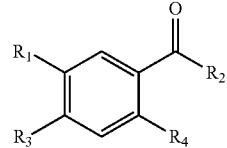

where $R_1$, $R_2$, and $R_3$ are independently one among hydrogen, a halogen atom, a phenyl group, an alkyl group of $C_1$~$C_9$, an alkoxy group of $C_1$~$C_9$, a vinyl group of $C_2$~$C_4$, and an acetyl group of $C_2$~$C_4$, and $R_4$ is one among a phenyl group, an alkyl group of $C_1$~$C_9$, an alkoxy group of $C_1$~$C_9$, a vinyl group of $C_2$~$C_4$, and an acetyl group of $C_2$~$C_4$.

The alignment layer may include a compound represented by Chemical Formula 2:

[Chemical Formula 2]

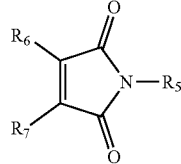

where $R_5$ is one among hydrogen, a halogen atom, a phenyl group, an alkyl group of $C_1$~$C_9$, an alkoxy group of $C_1$~$C_9$, a vinyl group of $C_2$~$C_4$, and an acetyl group of $C_2$~$C_4$, and $R_6$ and $R_7$ are independently one among hydrogen and an alkyl group of $C_1$~$C_6$.

The sealant may contact the alignment layer, and a contact surface between the sealant and the alignment layer may include a compound represented by Chemical Formula 3:

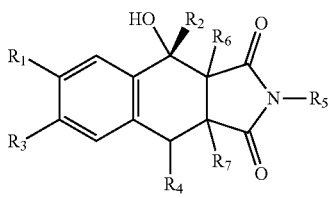

[Chemical Formula 3]

where $R_1$, $R_2$, $R_3$, and $R_5$ are independently one among hydrogen, a halogen atom, a phenyl group, an alkyl group of $C_1$~$C_9$, an alkoxy group of $C_1$~$C_9$, a vinyl group of $C_2$~$C_4$, and an acetyl group of $C_2$~$C_4$, and $R_4$ is one among a phenyl group, an alkyl group of $C_1$~$C_9$, an alkoxy group of $C_1$~$C_9$, a vinyl group of $C_2$~$C_4$, and an acetyl group of $C_2$~$C_4$, and $R_6$ and $R_7$ are independently one among hydrogen and an alkyl group of $C_1$~$C_6$.

The sealant may further include an epoxy resin, and the alignment layer may include amic acid.

The sealant may contact the alignment layer, and a contact surface between the sealant and the alignment layer may include a COO bond by a reaction of the epoxy resin with a carboxylic group (COOH) of the amic acid.

A bezel width of the display apparatus having the compound of the sealant may be relatively reduced compared to a bezel width of a display apparatus without the compound of the sealant.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Figure 1:
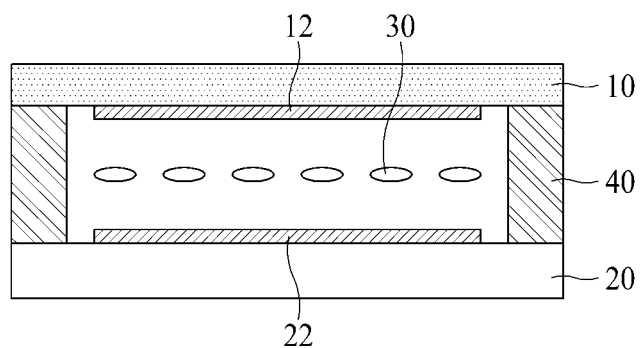
FIG. 1 is a schematic cross-sectional view of a related art LCD device.

Reference will now be made in detail to the exemplary embodiments of the present invention, examples of which are illustrated in the accompanying drawings. Wherever possible, the same reference numbers will be used throughout the drawings to refer to the same or like parts.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted. In a case where 'comprise', 'have', and 'include' described in the present specification are used, another part may be added unless 'only-' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

Hereinafter, exemplary embodiments of the present invention will be described in detail with reference to the accompanying drawings.

The inventors have researched on a method that creates a chemical bond between a sealant and an alignment layer on a contact surface of the sealant and the alignment layer so as to enhance a bonding force between the sealant and the alignment layer, thereby completing the invention. This will be described below in detail.

Since the sealant is finished through a hardening process after a coating process of the sealant, a bonding force between the sealant and the alignment layer is enhanced by applying a method that creates a chemical bond between the sealant and the alignment layer in a process of hardening the sealant. In other words, since the sealant undergoes an ultraviolet (UV) hardening process and a heat hardening process, the present invention applies a method that creates the chemical bond between the sealant and the alignment layer in the process of hardening the sealant so as to enhance the bonding force between the sealant and the alignment layer. The alignment layer is formed of polyimide that is produced by polymerizing a monomer, but since a monomer is not completely polymerized into polyimide generally, an unpolymerized intermediate product remains on a surface of the alignment layer. Therefore, when a component capable of being chemically bonded to the intermediate product is added into the sealant, the intermediate product of the alignment layer is chemically bonded to the component added into the sealant, and thus, the bonding force between the sealant and the alignment layer is enhanced.

Amic acid is produced as an intermediate product in a process of producing polyimide that is a component of the alignment layer. Therefore, the alignment layer includes polyimide and amic acid. Amic acid contains a carboxylic group (COOH), and the inventors have recognized that the carboxylic group (COOH) is bonded to an epoxy group by irradiating UV rays in a process of hardening the sealant. Therefore, when an epoxy group is added into the sealant and the sealant is hardened by the UV rays, the bonding force between the sealant and the alignment layer is enhanced by a chemical bond between the epoxy group included in the sealant and a carboxylic group (COOH) included in the alignment layer.

Figure 2:
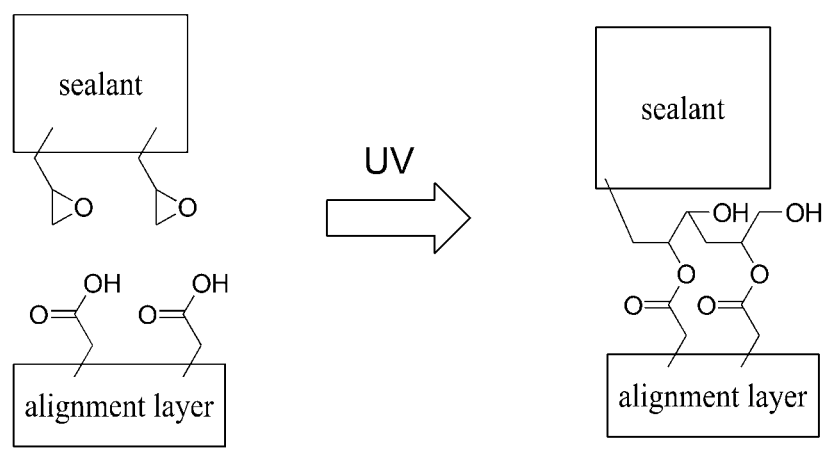
FIG. 2 illustrates a chemical bond form between a sealant and an alignment layer according to an embodiment of the present invention.

FIG. 2 illustrates a chemical bond form between a sealant and an alignment layer according to an embodiment of the present invention. As seen in FIG. 2, when an epoxy group is added into a sealant, a carboxylic group (COOH) of amic acid included in an alignment layer is chemically bonded to the epoxy group included in the sealant by irradiating UV rays in a process of hardening the sealant, and thus, a chemical bond that is a COO bond is created on a contact surface of the sealant and the alignment layer. Therefore, when the epoxy group is added into the sealant and a UV ray irradiating process is performed for the sealant, a COO bond (an ester bond) that is a chemical bond between the sealant and the alignment layer is created, thereby enhancing a bonding force between the sealant and the alignment layer. Since the bonding force between the sealant and the alignment layer is enhanced, the sealant and the alignment layer may be formed to contact each other, and a bezel width of the device is reduced.

Moreover, the inventors have additionally confirmed that a component of an intermediate product remaining in an alignment layer is changed depending on a process of forming the alignment layer. That is, amic acid remains in the alignment layer when the alignment layer is formed by a rubbing alignment process. When the alignment layer is formed by an UV alignment process, an imide rate increases, and thus, carboxylic groups (COOH) of amic acid remaining in the alignment layer are reduced. For this reason, even when the epoxy group is added into the sealant as described above, the inventors have confirmed that a bonding force between the sealant and the alignment layer is not enhanced. Therefore, the inventors have additionally researched on a component remaining in the alignment layer when the alignment layer is formed by the UV alignment process.

When an UV alignment layer is applied, an imide rate of polyimide that is a component of an alignment layer increases for solving a problem of image sticking. When an imide rate of polyimide increases, as described above, amic acids remaining in the alignment layer are reduced. Instead, the inventors have confirmed that when UV rays are irradiated on polyimide for an UV alignment, a bond in polyimide is broken, and thus, a maleimide functional group exists on a surface of the alignment layer. Therefore, a component capable of being chemically bonded to the maleimide functional group may be added into the sealant so as to enhance a bonding force between the sealant and the alignment layer.

The inventors have researched on a component that is capable of being chemically bonded to a maleimide functional group and is able to be added into a sealant, and as a result of the research, the inventors have confirmed that a diene compound is chemically bonded to the a maleimide functional group and is applied as a component of the sealant. Also, the inventors have confirmed that a diene compound represented by the following Chemical Formula 1 is suitable as the component of the sealant, and thus have completed the invention.

[Chemical Formula 1]

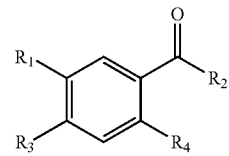

In Chemical Formula 1, $R_1$, $R_2$, and $R_3$ are independently one among hydrogen, a halogen atom, a phenyl group, an alkyl group of $C_1$~$C_9$, an alkoxy group of $C_1$~$C_9$, a vinyl group of $C_2$~$C_4$, and an acetyl group of $C_2$~$C_4$, and $R_4$ is one among a phenyl group, an alkyl group of $C_1$~$C_9$, an alkoxy group of $C_1$~$C_9$, a vinyl group of $C_2$~$C_4$, and an acetyl group of $C_2$~$C_4$.

The diene compound represented by Chemical Formula 1 may be chemically bonded to a maleimide functional group represented by the following Chemical Formula 2 through a reaction represented by the following Reaction Chemical Formula 1.

[Chemical Formula 2]

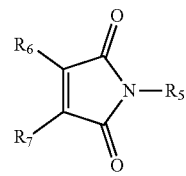

In Chemical Formula 2, $R_5$ is one among hydrogen, a halogen atom, a phenyl group, an alkyl group of $C_1$~$C_9$, an alkoxy group of $C_1$~$C_9$, a vinyl group of $C_2$~$C_4$, and an acetyl group of $C_2$~$C_4$, and $R_6$ and $R_7$ are independently one among hydrogen and an alkyl group of $C_1$~$C_6$.

[Reaction Formula 1]

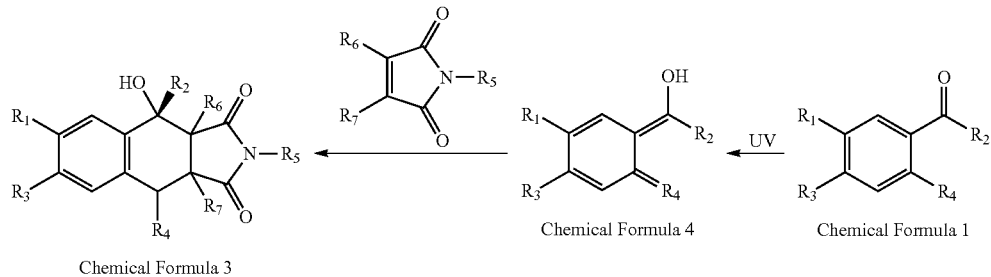

As seen in Reaction Formula 1, a compound represented by Chemical Formula 4 may be produced by irradiating an UV ray on the diene compound represented by Chemical Formula 1 for hardening a sealant, and a compound represented by Chemical Formula 3 may be produced by chemically bonding the compound represented by Chemical Formula 4 to the maleimide functional group represented by Chemical Formula 2. Therefore, a compound represented by Chemical Formula 3 may exist on a contact surface between the sealant and an alignment layer, and thus, a bonding force between the sealant and the alignment layer is enhanced.

In Chemical Formula 3, $R_1$, $R_2$, $R_3$, and $R_5$ are independently one among hydrogen, a halogen atom, a phenyl group, an alkyl group of $C_1$~$C_9$, an alkoxy group of $C_1$~$C_9$, a vinyl group of $C_2$~$C_4$, and an acetyl group of $C_2$~$C_4$, and $R_4$ is one among a phenyl group, an alkyl group of $C_1$~$C_9$, an alkoxy group of $C_1$~$C_9$, a vinyl group of $C_2$~$C_4$, and an acetyl group of $C_2$~$C_4$, and $R_6$ and $R_7$ are independently one among hydrogen and an alkyl group of $C_1$~$C_6$.

A material cannot be considered to be suitable as a sealant component by only the reason of being chemically bonded to the alignment layer. This is because an alignment direction of a completed UV alignment layer is in disorder again, if a polyimide bond of the completed UV alignment layer is broken by the UV rays which is irradiated on the diene compound represented by Chemical Formula 1 in Reaction Formula 1 for hardening the sealant.

Therefore, a material capable of creating a chemical bond within a wavelength range where the polyimide bond included in the alignment layer is not broken may be applied as a component of the sealant, and thus, the inventors have completed the invention after finally confirming that the diene compound represented by Chemical Formula 1 satisfies such a condition.

That is, a photo-alignment process or UV alignment process for polyimide which is the alignment layer may be performed by irradiating UV rays having a wavelength of 240 nm to 254 nm, but the compound represented by Chemical Formula 4 in Reaction Formula 1 may be produced by irradiating UV rays having a wavelength of 300 nm to 420 nm on the diene compound included in the sealant represented by Chemical Formula 1. In other words, since polyimide which is a component of the alignment layer cannot react within a wavelength of 300 nm to 420 nm, the alignment layer is prevented from being damaged by the UV ray irradiation.

Figure 3:
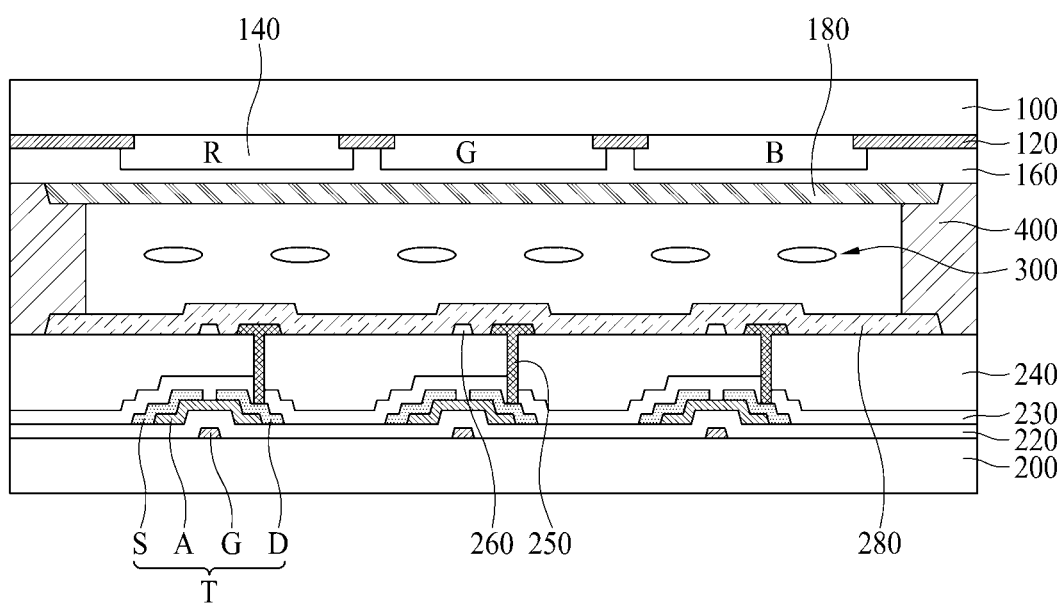
FIG. 3 is a schematic cross-sectional view of an LCD device according to an embodiment of the present invention.

FIG. 3 is a schematic cross-sectional view of a LCD device according to an embodiment of the present invention.

As seen in FIG. 3, the LCD device according to an embodiment of the present invention may include a first substrate 100, a second substrate 200, a liquid crystal layer 300, and a sealant 400.

The first substrate 100 may be an upper substrate of the LCD device. In detail, a light shielding pattern 120, a color filter 140, an overcoat layer 160, and a first alignment layer 180 may be formed on the first substrate 100, in more detail, on a bottom of the first substrate 100 facing the second substrate 200.

The light shielding pattern 120 may be formed on the bottom of the first substrate 100. The light shielding pattern 120 prevents light from being leaked to an area other than a pixel area. The light shielding pattern 120 may be formed in a matrix structure, and an area between adjacent light shielding patterns 120 may constitute the pixel area.

The color filter 140 may be formed on the bottom of the first substrate 100. The color filter 140 may be formed in the area between the adjacent light shielding patterns 120. The color filter 140 may include a red (R) color filter, a green (G) color filter, and a blue (B) color filter which are respectively provided in a plurality of pixels.

The overcoat layer 160 may be formed on a bottom of each of the light shielding pattern 120 and the color filter 140. The overcoat layer 160 may planarize the bottom surface of the first substrate 100.

The first alignment layer 180 may be formed on a bottom surface of the overcoat layer 160 to determine an alignment direction of liquid crystals in the liquid crystal layer 300. The first alignment layer 180 may include polyimide. The first alignment layer 180 may be formed by a rubbing alignment process or a UV alignment process.

When the first alignment layer 180 is formed by the rubbing alignment process, as described above, the first alignment layer 180 may include amic acid which is an intermediate product, and thus, a COOH group of amic acid may be included in the bottom surface of the first alignment layer 180.

When the first alignment layer 180 is formed by the UV alignment process, as described above, a content of amic acid which is the intermediate product may be reduced. However, a chemical bond in polyimide may be broken by UV ray irradiation, and thus, the maleimide functional group represented by Chemical Formula 2 may be included in the bottom surface of the first alignment layer 180.

The second substrate 200 may be a lower substrate of the LCD device. A thin film transistor (TFT) T, a pixel electrode 250, a common electrode 260, and a second alignment layer 280 may be formed on the second substrate 200, in more detail, on a top surface of the second substrate 200 facing the first substrate 100.

In more detail, a gate electrode G, a gate insulation layer 220, an active layer A, a source electrode S, a drain electrode D, a passivation layer 230, a planarization layer 240, a pixel electrode 250, a common electrode 260, and a second alignment layer 280 may be formed on the top surface of the second substrate 200.

The gate electrode G may be formed on the second substrate 200.

The gate insulation layer 220 may be formed on the gate electrode G to insulate the gate electrode G from the active layer A.

The active layer A may be formed on the gate insulation layer 220.

The source electrode S may be formed on one side of the active layer A, and the drain electrode D may be formed on the other side of the active layer A.

The passivation layer 230 may be formed on the source electrode S and the drain electrode D to protect the source electrode S and the drain electrode D.

The planarization layer 240 may be formed on the passivation layer 230 to planarize the top surface of the second substrate 200.

The TFT T may include the gate electrode G, the active layer A, the source electrode S, and the drain electrode D. In FIG. 3, a TFT having a bottom gate structure where the gate electrode G is disposed under the active layer A is illustrated, but the TFT T according to an embodiment of the present invention may include a top gate structure where the gate electrode G is disposed over the active layer A. In addition, a structure of the TFT T according to an embodiment of the present invention may be changed to various structures, known to those skilled in the art, such as a double gate (or a dual gate) structure and/or the like.

The pixel electrode 250 and the common electrode 260 may be formed on the planarization layer 240. The pixel electrode 250 may be connected to the drain electrode D of the TFT T through a contact hole which is formed in the planarization layer 240 and the passivation layer 230. The common electrode 260 may be arranged in parallel with the pixel electrode 250, and thus, an alignment state of the liquid crystal layer 300 may be adjusted by a horizontal electric field between the common electrode 260 and the pixel electrode 250.

In FIG. 3, the pixel electrode 250 and the common electrode 260 are illustrated as being formed on the same layer, but are not limited thereto. As another example, the pixel electrode 250 and the common electrode 260 may be formed on different layers.

The LCD device according to an embodiment of the present invention may be applied to various modes, known to those skilled in the art, such as a twisted nematic (TN) mode and a vertical alignment (VA) mode where the alignment state of the liquid crystal layer 300 is adjusted by a vertical electric field, in addition to an in-plane switching (IPS) mode and a fringe field switching (FFS) mode where the alignment state of the liquid crystal layer 300 is adjusted by a horizontal electric field. Therefore, positions and shapes where the common electrode 260 and the pixel electrode 250 are formed may be variously changed. For example, in the FFS mode, the common electrode 260 may be formed between the passivation layer 230 and the planarization layer 240. In the TN mode, the common electrode 260 may be formed at a position of the overcoat layer 160 on the first substrate 100, and the overcoat layer 160 may be omitted.

The second alignment layer 280 may be formed on the pixel electrode 250 and the common electrode 260 to determine an initial alignment direction of liquid crystals in the liquid crystal layer 300. An alignment direction of the second alignment layer 280 may be vertical to that of the first alignment layer 180, but is not limited thereto.

Similarly to the above-described first alignment layer 180, the second alignment layer 280 may include polyimide and may be formed by the rubbing alignment process or the UV alignment process. Therefore, a COOH group of amic acid may be included in a top surface of the second alignment layer 280, and in addition to the COOH group, the maleimide functional group represented by Chemical Formula 2 may be included in the top surface of the second alignment layer 280.

The liquid crystal layer 300 may be formed between the first substrate 100 and the second substrate 200. When the first and second alignment layers 180 and 280 are formed by the UV alignment process, the liquid crystal layer 300 may be formed of negative liquid crystal, but is not limited thereto. The negative liquid crystal is liquid crystal of which dielectric anisotropy ($\Delta\varepsilon = \varepsilon\| - \varepsilon\perp$) is a negative (−) value. The negative liquid crystal is more effective than positive liquid crystal, which is liquid crystal of which dielectric anisotropy has a positive (+) value, in terms of a transmittance or luminance.

The sealant 400 may be formed between the first substrate 100 and the second substrate 200. The sealant 400 may be formed in an edge area of each of the first substrate 100 and the second substrate 200 to bond the first substrate 100 to the second substrate 200. The sealant 400 may contact at least one of the first and second alignment layers 180 and 280, and particularly, may be chemically bonded to an alignment layer contacting the sealant 400. Although it is illustrated in the drawing that the sealant 400 contacts all the first and second alignment layers 180 and 280, the sealant 400 may create a chemical bond in contact with one of the first and second alignment layers 180 and 280.

The sealant 400 may include the diene compound represented by Chemical Formula 1 which is capable of being chemically bonded to the maleimide functional group, included in the first and second alignment layers 180 and 280, by UV rays which are irradiated when hardening the sealant 400. Therefore, a contact surface between the sealant 400 and the first alignment layer 180 or a contact surface between the sealant 400 and the second alignment layer 280 may include the compound represented by Chemical Formula 3 created by Reaction Formula 1.

In this case, since each of the first and second alignment layers 180 and 280 has a predetermined alignment direction, the alignment direction of each of the first and second alignment layers 180 and 280 may not be changed by the UV rays which are irradiated when hardening the sealant 400.

That is, a chemical bond of a compound for each of the first and second alignment layers 180 and 280 may not be broken within a wavelength range of the UV rays which is irradiated when hardening the sealant 400. In other words, an alignment direction of the compound for each of the first and second alignment layers 180 and 280 may be determined by UV rays having a wavelength range which does not overlap the wavelength range of the UV rays which is irradiated when hardening the sealant 400.

The sealant 400 may include an epoxy resin capable of being chemically bonded to a COOH group of amic acid included in each of the first and second alignment layers 180 and 280. Therefore, the contact surface between the sealant 400 and the first alignment layer 180 or the contact surface between the sealant 400 and the second alignment layer 280 may include a COO bond by a reaction of an epoxy resin with a COOH group. However, when the first and second alignment layers 180 and 280 are formed by the UV alignment process, the epoxy resin may not be included in the sealant 400.

The sealant 400 may include an acryl resin, a polymerization initiator, a coupling agent, a hardener, and a filler, in addition to the diene compound represented by Chemical Formula 1 and the epoxy resin.

The polymerization initiator may include an UV initiator and a heat initiator. The UV initiator and the heat initiator may use various materials known to those skilled in the art. The coupling agent may use a silane-based compound, but is not limited thereto. As another example, the coupling agent may use various materials known to those skilled in the art. The hardener may also use various materials known to those skilled in the art. The filler may include a silica component, but is not limited thereto. As another example, the filler may use various materials known to those skilled in the art.

In the drawing, the sealant 400 is illustrated as contacting the overcoat layer 160 on the first substrate 100 and the planarization layer 240 on the second substrate 200, but is not limited thereto. For example, the overcoat layer 160 may not extend to the edge area of the first substrate 100, and thus, the sealant 400 may contact the light shielding pattern 120 on the first substrate 100. Also, the planarization layer 240 may not extend to the edge area of the second substrate 200, and thus, the sealant 400 may contact the passivation layer 230.

It is illustrated in the drawing that only a portion of the sealant 400 contacts the first and second alignment layers 180 and 280, but a whole portion of the sealant 400 may contact the first and second alignment layers 180 and 280.

As described above, according to the embodiment of the present invention, since the sealant includes a diene compound, the diene compound may be chemically bonded to the alignment layer, thereby enhancing a bonding force between the sealant and the alignment layer. Accordingly, an adhesive force between the first substrate and the second substrate is enhanced.

Moreover, according to the embodiment of the present invention, since the sealant and the alignment layer are formed to contact each other, a bezel width of a device apparatus is reduced, thereby providing the display apparatus where a display screen displaying an image is enlarged.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display apparatus, comprising:
    a first substrate and a second substrate facing each other;
    an alignment layer on at least one of the first substrate and the second substrate, an alignment direction of the alignment layer being configured by first ultraviolet rays; and
    a sealant configured to bond the first substrate to the second substrate,
    wherein the sealant includes a compound that reacts with the alignment layer, and the compound of the sealant is chemically bonded to the alignment layer by second ultraviolet rays,
    wherein the sealant includes a compound represented by Chemical Formula 1:

[Chemical Formula 1]

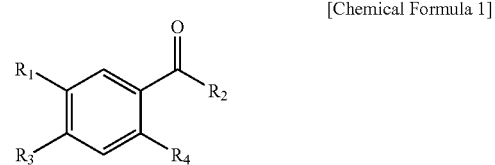

where $R_1$, $R_2$, and $R_3$ are independently one among hydrogen, a halogen atom, a phenyl group, an alkyl group of $C_1$~$C_9$, an alkoxy group of $C_1$~$C_9$, a vinyl group of $C_2$~$C_4$, and an acetyl group of $C_2$~$C_4$, and $R_4$ is one among a phenyl group, an alkyl group of $C_1$~$C_9$, an alkoxy group of $C_1$~$C_9$, a vinyl group of $C_2$~$C_4$, and an acetyl group of $C_2$~$C_4$.

2. The display apparatus of claim 1, wherein the alignment direction of the alignment layer is not changed by a wavelength range of the second ultraviolet rays, and a wavelength range of the first ultraviolet rays does not overlap with the wavelength range of the second ultraviolet rays.

3. The display apparatus of claim 2, wherein the compound of the sealant reacts with the alignment layer within the wavelength range of the second ultraviolet rays where a chemical bond in the alignment layer is maintained.

4. The display apparatus of claim 3, wherein the wavelength range of the second ultraviolet rays where the chemical bond in the alignment layer is maintained is 300 nm to 420 nm.

5. The display apparatus of claim 2, wherein the wavelength range of the first ultraviolet rays is 240 nm to 254 nm.

6. The display apparatus of claim 1, wherein the alignment layer includes a compound represented by Chemical Formula 2:

[Chemical Formula 2]

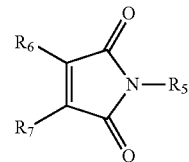

where $R_5$ is one among hydrogen, a halogen atom, a phenyl group, an alkyl group of $C_1$~$C_9$, an alkoxy group of $C_1$~$C_9$, a vinyl group of $C_2$~$C_4$, and an acetyl group of $C_2$~$C_4$, and $R_6$ and $R_7$ are independently one among hydrogen and an alkyl group of $C_1$~$C_6$.

7. The display apparatus of claim 1, wherein the sealant contacts the alignment layer, and a contact surface between the sealant and the alignment layer includes a compound represented by Chemical Formula 3:

[Chemical Formula 3]

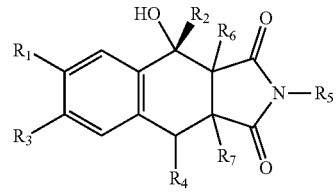

where $R_1$, $R_2$, $R_3$, and $R_5$ are independently one among hydrogen, a halogen atom, a phenyl group, an alkyl group of $C_1$~$C_9$, an alkoxy group of $C_1$~$C_9$, a vinyl group of $C_2$~$C_4$, and an acetyl group of $C_2$~$C_4$, and $R_4$ is one among a phenyl group, an alkyl group of $C_1$~$C_9$, an alkoxy group of $C_1$~$C_9$, a vinyl group of $C_2$~$C_4$, and an acetyl group of $C_2$~$C_4$, and $R_6$ and $R_7$ are independently one among hydrogen and an alkyl group of $C_1$~$C_6$.

8. The display apparatus of claim 1, wherein a bezel width of a display apparatus in which the sealant contacts the alignment layer is smaller than a bezel width of a display apparatus in which the sealant does not contact the alignment layer.

9. The display apparatus of claim 1, wherein the sealant includes a diene compound.

10. The display apparatus of claim 1, wherein
the sealant further includes an epoxy resin, and
the alignment layer includes amic acid.

11. The display apparatus of claim 10, wherein
a contact surface between the sealant and the alignment layer includes a COO bond by a reaction of the epoxy resin with a carboxylic group (COOH) of the amic acid.

12. The display apparatus of claim 1, further comprising a liquid crystal layer between the first substrate and the second substrate, the liquid crystal layer having a negative dielectric anisotropy.

13. The display apparatus of claim 9, wherein the alignment layer includes a maleimide functional group, the maleimide functional group being chemically bonded to the diene compound of the sealant.

14. The display apparatus of claim 13, wherein the maleimide functional group of the alignment layer is generated by the first ultraviolet rays.

15. The display apparatus of claim 13, wherein the maleimide functional group is chemically bonded to the diene compound by the second ultraviolet rays.

* * * * *